US006228938B1

(12) United States Patent
Eichenauer et al.

(10) Patent No.: US 6,228,938 B1
(45) Date of Patent: *May 8, 2001

(54) ABS MATERIALS

(75) Inventors: Herbert Eichenauer, Dormagen; Karl-Heinz Ott, Leverkusen; Dieter Wittmann, Köln; Alfred Pischtschan, Kürten-Eichhof, all of (DE)

(73) Assignee: Bayer AG, Leverleusen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/262,745

(22) Filed: Jun. 20, 1994

Related U.S. Application Data

(63) Continuation-in-part of application No. 08/052,591, filed on Apr. 26, 1993, now abandoned.

(30) Foreign Application Priority Data

| May 6, 1992 | (DE) | 42 14 939 |
| May 6, 1992 | (DE) | 42 14 940 |
| May 6, 1992 | (DE) | 42 14 942 |

(51) Int. Cl.[7] .............................. C08L 25/12; C08L 55/02; C08L 69/00
(52) U.S. Cl. .................. 525/67; 525/64; 525/66; 525/80; 525/83; 525/84; 525/85; 525/86
(58) Field of Search ...................... 525/64, 66, 67, 525/80, 83, 84, 85, 86, 238

(56) References Cited

U.S. PATENT DOCUMENTS

| 3,903,200 | 9/1975 | Cincera et al. | 260/876 |
| 3,928,494 | 12/1975 | Aliberti | 260/876 |
| 4,068,064 | 1/1978 | Platt et al. | 526/194 |
| 4,520,165 | 5/1985 | Zabrocki et al. | 525/84 |
| 4,560,726 | 12/1985 | Eichenauer et al. | 525/71 |
| 4,564,654 | 1/1986 | Serini et al. | 525/67 |
| 4,868,235 | 9/1989 | Muehlbach | 524/252 |
| 4,895,898 | 1/1990 | Kress et al. | 525/67 |
| 4,920,178 | 4/1990 | Zabrocki et al. | 525/262 |
| 5,093,419 | * 3/1992 | Kodama | 525/64 |
| 5,216,062 | * 6/1993 | Lausberg | 525/66 |
| 5,302,663 | * 4/1994 | Eichenauer | 525/67 |
| 5,302,664 | * 4/1994 | Eichenauer | 525/67 |

FOREIGN PATENT DOCUMENTS

| 2 901 576 | 7/1980 | (DE) . |
| 0 051 875 | 5/1982 | (EP) . |
| 0 146 021 | 6/1985 | (EP) . |
| 0 161 691 | 11/1985 | (EP) . |
| 0 210 510 | 2/1987 | (EP) . |
| 0 212 123 | 3/1987 | (EP) . |
| 0 337 187 | 10/1989 | (EP) . |

OTHER PUBLICATIONS

Hiemenz, "Polymer Chemistry"; 1984 pp536–541.*
English translation of the claims of EP–A 212 123 as filed in Japan.
Orbit Abstract of EP–A–0 212 123.
Orbit Abstract of DE–A–2 619 969.
Orbit Abstract of EP–A–0 359 953.
Orbit Abstract of DE–A–2 842 005.
Orbit Abstract of DE–A–3 506 472.
Orbit Abstract of DE–A–1 300 241.
Orbit Abstract of DE–A–3 100 785.
Orbit Abstract of EP–A–0 337 187.
Orbit Abstract of DE–A–2 901 576.

* cited by examiner

Primary Examiner—David J. Buttner
(74) Attorney, Agent, or Firm—Connolly Bove Lodge and Hutz LLP

(57) ABSTRACT

Thermoplastic materials containing

A) 5 to 80 parts by weight of a thermoplastic co- or terpolymer made from the monomers styrene, α-methylstyrene, methyl methacrylate, acrylonitrile with an average molecular weight ($\bar{M}_w$) of 70,000 to 119,000, B) 1 to 30 parts by weight of a thermoplastic copolymer made from 60 to 95% by weight of styrene and/or α-methylstyrene and 40 to 5% by weight of acrylonitrile with an average molecular weight ($\bar{M}_w$) of 25,000 to 49,500, C) 0.1 to 10 parts by weight of a thermoplastic co- or terpolymer made from the monomers styrene, α-methylstyrene, methyl methacrylate, acrylonitrile with an average molecular weight ($\bar{M}_w$) of 1,500 to 6,000 and D) 0.5 to 50 parts by weight of a particulate rafted rubber with a glass transition temperature ≦10° C. and an average particle diameter ($d_{50}$) of 0.05 to 0.50 μm, which contains 15 to 80 parts by weight of a chemically bonded polymer made from styrene, methyl methacrylate, acrylonitrile or mixtures thereof, per 100 parts by weight of rubber and optionally E) 10 to 300 parts by weight of an aromatic polycarbonate and/or poly-alkylene terephthalate per 100 parts by weight of A+B+C+D, or F) 1 to 40 parts by weight of a thermoplastic polyurethane.

20 Claims, No Drawings

ABS MATERIALS

CROSS-REFERENCE TO RELATED APPLICATION

The present application is a continuation-in-part of U.S. patent application Ser. No. 08/052,591 now abandoned filed on Apr. 26, 1993 in the names of Herbert Eichenauer et al.

ABS polymers are distinguished by a balanced set of general properties and have therefore been used for many years in large amounts as thermoplastic resins for the manufacture of moulded items of all types.

With increasing use of these polymers, however, the demands on the ABS material are also increasing, especially if new types of parts are being prepared from it or new areas of application are intended to be developed by the use of this thermoplastic material.

Thus, for new types of application, e.g. for the manufacture of parts with large areas or with long flow paths (when injection moulding), materials are required which simultaneously possess high strength, sufficiently high heat resistance, high surface gloss and very good processability.

ABS materials which possess each of the required properties separately, are known, e.g. ABS polymers with high strength are described in EP-A 116 330; although here only products without a good surface gloss, with low heat resistance and very low hardness are obtainable.

The preparation of ABS polymers with very good flow properties by adding relatively large amounts of lubricant is also known, but this additive simultaneously impairs the other properties.

It was found that the following mixtures of the ABS type simultaneously possess very high strength, high heat resistance, good hardness, good surface gloss and very good processability:

A) 5 to 80 parts by weight, preferably 20 to 70 parts by weight, of a thermoplastic co- or terpolymer, made from the monomers styrene, α-methylstyrene, methyl methacrylate, acrylonitrile, with an average molecular weight ($\overline{M}_w$) of 70,000 to 150,000, preferably 75,000 to 120,000, most preferably 70,000 to 119,000, B) 1 to 30 parts by weight, preferably 4 to 20 parts by weight, of a thermoplastic copolymer made from 60 to 95% by weight, preferably 65 to 85% by weight, of styrene and/or α-methylstyrene and 40 to 5% by weight, preferably 35 to 15% by weight, of acrylonitrile with an average molecular weight ($\overline{M}_w$) of 25,000 to 60,000, preferably 30,000 to 55,000, most preferably 25,000 to 49,500, C) 0.1 to 10 parts by weight, preferably 0.5 to 5 parts by weight of a thermoplastic co- or terpolymer, made from the monomers styrene, α-methylstyrene, methyl methacrylate, acrylonitrile, with an average molecular weight ($\overline{M}_w$) of 1,500 to 6,000, preferably 2,000 to 6,000, and D) 0.5 to 50 parts by weight, preferably 1 to 40 parts by weight, particularly 12 to 35 parts by weight, of a particulate grafted rubber with a glass transition temperature $\leq 10°$ C. and an average particle diamater ($d_{50}$) of 0.05 to 0.50 μm, preferably 0.10 to 0.45 μm which contains 15 to 80 parts by weight, preferably 20 to 75 parts by weight, of a chemically bonded polymer made from styrene, methyl methacrylate, acrylonitrile or mixtures thereof, per 100 parts by weight of rubber.

The mixtures according to the invention (moulding compounds) may be prepared by blending A, B, C and D in the molten state, optionally with the addition of the usual additives, until a homogeneous state is achieved.

A preferred process for the preparation of the moulding compounds is to mix B, C and D first and then to blend this mixture with A.

In a preferred embodiment the mixtures contain additionally

E) 10 to 300 parts by weight, preferably 25 to 200 parts by weight, and particularly preferably 25 to 150 parts by weight, of an aromatic poly-carbonate and/or polyalkylene terephthalate, per 100 parts by weight of A+B+C+D.

These mixtures have the following preferred compositions:

A) 5 to 60 parts by weight, preferably 10 to 50 parts by weight, of a thermo-plastic co- or terpolymer made from the monomers styrene, α-methylstyrene, methyl methacrylate, acrylonitrile, with an average molecular weight, ($\overline{M}_w$) of 70,000 to 150,000, preferably 75,000 to 120,000, most preferably 70,000 to 119,000, B) 1 to 15 parts by weight, preferably 2 to 10 parts by weight, of a thermo-plastic copolymer made from 60 to 95% by weight, preferably 65 to 85% by weight of styrene and/or α-methylstyrene and 40 to 5% by weight, preferably 35 to 15% by weight, of acrylonitrile, with an average molecular weight ($\overline{M}_w$) of 25,000 to 60,000, preferably 30,000 to 55,000, most preferably 25,000 to 49,500, C) 0.1 to 5 parts by weight, preferably 0.5 to 2.5 parts by weight, of a thermoplastic co- or terpolymer, made from the monomers styrene, α-methylstyrene, methyl methacrylate, acrylonitrile, with an average molecular weight ($\overline{M}_w$) of 1,500 to 6,000, preferably 2,000 to 6,000, D) 0.5 to 40 parts by weight, preferably 1 to 35 parts by weight, in particular 5 to 35 parts by weight, of a particulate grafted rubber with a glass transition temperature of $\leq 10°$ C. and an average particle diameter ($d_{50}$) of 0.05 to 0.50 μm, preferably 0.10 to 0.45 μm, which contains 15 to is 80 parts by weight, preferably 20 to 75 parts by weight, of a chemically bonded polymer made from styrene, methyl methacrylate, acrylonitrile or mixtures thereof, per 100 parts by weight of rubber and E) 10 to 300 parts by weight, preferably 25 to 200 parts by weight, and particularly preferably 25 to 150 parts by weight, of an aromatic polycarbonate and/or polyalkylene terephthalate, per 100 parts by weight of A+B+C+D.

These preferred mixtures (moulding compounds) may be prepared by blending A, B. C, D and E in the molten state, optionally with the addition of the usual additives, until a homogeneous state is achieved.

A Preferred process for preparing these moulding compounds is to mix B, C and D initially and then to blend this mixture with A and E.

In another preferred embodiment the mixture contains additionally:

F) 1 to 40 parts by weight, preferably 2.5 to 30 parts by weight, of a thermoplastic polyurethane.

These mixtures have the following preferred compositions:

A) 10 to 80 parts by weight, preferably 20 to 70 parts by weight, of a thermo-plastic co- or terpolymer, made from the monomers styrene, α-methylstyrene, methyl methacrylate, acrylonitrile, with an average molecular weight ($\overline{M}_w$) of 70,000 to 150,000, preferably 75,000 to 120,000, most preferably 70,000 to 119,000, B) 1 to 30 parts by weight, preferably 4 to 20 parts by weight, of a thermoplastic copolymer made from 60 to 95% by weight, preferably 65 to 85% by weight, of styrene and/or α-methylstyrene and 40 to 5% by weight, preferably 35 to 15% by weight, of acrylonitrile with an average weight ($\overline{M}_w$) of 25,000 to 60,000, preferably 30,000 to 55,000, most preferably 25,000 to 49,500, C) 0.1 to 5 parts by weight, preferably 0.5 to 2.5 parts by weight, of a thermoplastic co- or terpolymer, made from the monomers styrene, α-methylstyrene, methyl methacrylate, acrylonitrile, with an average molecular weight ($\overline{M}_w$) of 1,500 to 6,000, preferably 2,000 to 6,000, D) 0.5 to 50 parts by weight, preferably 1 to 40 parts by weight, in particular 12 to 35 parts by weight, of a particulate grafted rubber with a glass transition temperature of $\leq 10°$ C. and an average particle diameter ($d_{50}$) of 0.05 to 0.50 µm, preferably 0.10 to 0.45 µm, which contains 15 to 80 parts by weight, preferably 20 to 75 parts by weight, of a chemically bonded polymer made from styrene, methyl methacrylate, acrylonitrile or mixtures thereof, per 100 parts by weight of rubber, and F) 1 to 40 parts by weight, preferably 2.5 to 30 parts by weight, and particularly preferably 2.5 to 15 parts by weight of a thermoplastic polyurethane.

These Preferred mixtures (moulding compounds) may be prepared by blending A, B, C, D and F in the molten state, optionally with the addition of the usual additives, until a homogeneous state is achieved.

A Preferred process for preparing these materials is to mix B, C and D first and then to blend this mixture with A and F.

Suitable thermoplastic polymers A according to the invention consist of any combinations of polymerised styrene, α-methylstyrene, methyl methacrylate and acrylonitrile. Particularly preferred polymers A are obtained from styrene/acrylonitrile mixtures, α-methylstyrene/acrylonitrile mixtures and styrene/α-methylstyrene/acrylonitrile mixtures.

The polymers A are known and may be prepared by radical polymerisation, especially by emulsion, suspension, solution or bulk polymerisation (DE-OS 2 619 969).

They must have average molecular weights ($\overline{M}_w$) of 70,000 to 150,000, preferably 75,000 to 120,000, most preferably 70,000 to 119,000, and $\overline{M}_w/\overline{M}_n - 1$ value of 1 to 5, preferably $\leq 2$.

Suitable thermoplastic polymers B according to the invention are obtained by polymerisation of 60 to 95% by weight, preferably 65 to 85% by weight of styrene and/or α-methylstyrene and 40 to 5% by weight, preferably 35 to 15% by weight of acrylonitrile.

The polymers B are known and may be prepared by radical polymerization, especially by emulsion, suspension, solution or bulk polymerisation (e.g. according to DE-OS 2 619 969); they must also be produced e.g. during graft polymerisations performed in emulsion, suspension, solution or bulk in the form of polymers which are not chemically bonded to the graft base (generally rubber). They must have average molecular weights ($\overline{M}_w$) of 25,000 to 60,000, preferably 30,000 to 55,000, most preferably 25,000 to 49,500 and a $\overline{M}_w/\overline{M}_n - 1$ value of 1 to 5, preferably $\leq 2$.

Suitable thermoplastic polymers C according to the invention are obtained by polymerisation of any mixtures of styrene, α-methylstyrene, methyl methacrylate, acrylonitrile. Particularly preferred polymers C are obtained from styrene/acrylo-nitrile mixtures, α-methylstyrene/acrylonitrile mixtures, styrene/α-methyl-styrene/acrylonitrile mixtures.

Polymers C are known and can be prepared by radical polymerisation, especially by emulsion, suspension, solution or bulk polymerisation (e.g. according to DE-OS 2 619 969, using compounds for regulating the molecular weight). They must have average molecular weights ($\overline{M}_w$) of 1,500 to 6,000, preferably 2,000 to 6,000.

To prepare the grafted rubbers D, suitable rubbers with a glass temperature $\leq 10°$ C. are in particular polybutadiene, butadiene/styrene copolymers, butadiene/acrylonitrile copolymers, polyisoprene or alkyl acrylate rubbers based on $C_1-C_8$-alkyl acrylates, especially, ethyl, butyl, ethylhexyl acrylates.

The alkyl acrylate rubbers may also contain up to 30% by weight (relative to the rubber) of copolymerised monomers such as vinyl acetate, acrylonitrile, styrene, methyl methacrylate and/or vinyl ether. Furthermore, the alkyl acrylate rubbers may also contain small amounts, preferably up to 5% by weight (relative to the rubber), of copolymerised ethylenically unsaturated monomers which can act as cross-linking agents. Such cross-linkers are e.g. alkylenediol diacrylates, and methacrylates, polyester diacrylates and methacrylates, divinyl benzene, trivinyl benzene, triallyl cyanurate, allyl acrylate, allyl methacrylate, butadiene or isoprene.

Also suitable (as a grafting base) are acrylate rubbers with a core/shell structure with a core made from a cross-linked diene rubber (a polymer made from one or more conjugated dienes, such as polybutadiene, or a copolymer of a conjugated diene with an ethylenically unsaturated monomer such as styrene and/or acrylonitrile).

The preferred rubber for preparing the graft rubber D) is polybutadiene.

The rubbers are present in the graft rubber D in the form of at least partly cross-linked particles with an average particle diameter ($d_{50}$) of 0.05 to 0.50 µm, preferably 0.10 to 0.45 µm.

The graft rubbers D contain 15 to 80 parts by weight, preferably 20 to 75 parts by weight, of a chemically bonded polymer made from styrene, methyl methacrylate, acrylonitrile or mixtures thereof, per 100 parts by weight of rubber.

The graft rubbers D are prepared by radical polymerisation of the abovementioned monomers (styrene, α-methylstyrene, methyl methacrylate, acrylonitrile or mixtures) in the presence of the rubbers, preferably by emulsion polymerisation (DE-OS 1 300 241).

Particularly preferred craft rubbers D are ABS polymers.

Suitable thermoplastic polycarbonates E are homopolycarbonates and copolycarbonates made from diphenols of the formulas (I) and (II)

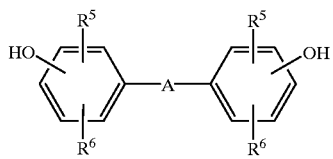

(I)

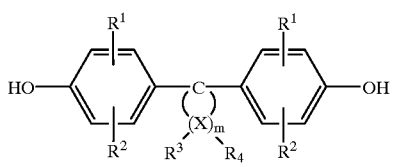

(II)

in which
- A is a single covalent bond, $C_1$–$C_5$-alkylene, $C_2$–$C_5$-alkylidene, $C_5$–$C_6$-cycloalkylidene, —O—, —S— or —$SO_2$—,
- $R^5$ and $R^6$, independently of each other, represent hydrogen, methyl or halogen, especially hydrogen, methyl, chlorine or bromine,
- $R^1$ and $R^2$, independently of each other, represent hydrogen, halogen, preferably chlorine or bromine, $C_1$–$C_8$-alkyl, preferably methyl, ethyl, $C_5$–$C_6$-cycloalkyl, preferably cyclohexyl, $C_6$–$C_{10}$-aryl, preferably phenyl, or $C_7$–$C_{12}$-aralkyl, preferably phenyl-$C_1$–$C_4$-alkyl, especially benzyl,
- m is an integer from 4 to 7, preferably 4 or 5,
- $R^3$ and $R^4$ are individually selectable for each X and represent, independently of each other, hydrogen or $C_1$–$C_6$-alkyl and
- x represents carbon.

The polycarbonates E may be linear or branched, they may contain aromatically bonded halogen, preferably bromine and/or chlorine, but they may also be halogen-free.

The polycarbonates E may be used individually or as a mixture.

Diphenols of the formulas (I) and (II) are known from the literature or may be prepared by processes known from the literature (see e.g. EP-A 0 359 953)

Preparation of the polycarbonates E which are suitable according to the invention is known and is possible e.g. using phosgene by the phase boundary process or using phosgene by processes in a homogeneous phase (the so-called pyridine process), wherein the molecular weight may be set in known manner by the appropriate amount of known chain-terminators.

Suitable chain-terminators are e.g. phenol, p-tert.butyl-phenol, long-chain alkylphenols such as 4-(1,3-tetramethyl-butyl)phenol according to DE-OS 2 842 005, monoalkylphenols, dialkylphenols with a total of 8 to 20 carbon atoms in the alkyl substituents according to DE-OS 3 506 472, such as p-nonylphenol, 2,5-di-tert.butylphenol, p-tert.octylphenol, p-dodecylphenol, 2-(3,5-dimethylheptyl)-phenol, and 4-(3,5-dimethylheptyl)-phenol. The amount of chain-terminator required is generally 0.5 to 10 mol-%, relative to the sum of the diphenols (I) and (II).

The polycarbonates E which are suitable according to the invention may be branched in known manner, and are preferably branched by the incorporation of 0.05 to 2.0 mol-%, relative to the sum of diphenols used, of three-functional or higher-functional compounds, e.g. those with three or more than three phenolic OH groups.

They have average molecular weights ($\overline{M}_w$, weight average), determined e.g. by ultra-centrifuging or by measurement of scattered light, of 10,000 to 200,000. preferably 20,000 to 80,000.

Suitable diphenols of the formulas (I) and (II) are e.g. hydroquinone, resorcinol, 4,4'-dihydroxydiphenyl, 2,2-bis-(4-hydroxyphenyl)-propane, 2,4-bis-(4-hydroxyphenyl)-2-methylbutane, 2,2-bis-(4-hydroxy-3,5-dimethylphenyl)-propane, 2,2-bis-(4-hydroxy-3,5-dichlorophenyl)-propane, 2,2-bis-(4-hydroxy-3,5-dibromophenyl)-propane, 1,1-bis-(4-hydroxyphenyl)-cyclohexane, 1,1-bis-(4-hydroxyphenyl)-3,3,5-trimethylcyclohexane, 1,1-bis-(4-hydroxyphenyl)-3,3-dimethylcyclohexane, 1,1-bis-(4-hydroxyphenyl)-3,3,5,5-tetramethylcyclohexane or 1,1-bis-(4-hydroxyphenyl)-2,4,4-trimethylcyclopentane.

Preferred diphenols of the formula (I) are 2,2-bis-(4-hydroxyphenyl)-propane and 1,1-bis-(4-hydroxyphenyl)-cyclohexane, a preferred phenol of the formula (II) is 1,1-bis-(4-hydroxyphenyl)-3,3,5-trimethyl-cyclohexane.

Mixtures of diphenols may also be used.

Suitable polyalkylene terephthalates E are reaction products from aromatic dicarboxylic acids or their reactive derivatives (e.g. dimethyl esters or anhydrides) and aliphatic, cycloaliphatic or arylaliphatic diols and mixtures of such reaction products.

Preferred polyalkylene terephthalates E may be prepared from terephthalic acid (or its reactive derivatives) and aliphatic or cycloaliphatic diols with 2 to 10 carbon atoms by known methods (Kunststoff-Handbuch, vol.VIII, p.695 et seq., Carl Hanser Verlag, Munich 1973).

In preferred polyalkylene terephthalates E, 80 to 100, preferably 90 to 100 mol-% of the dicarboxylic acid groups are terephthalic acid groups and 80 to 100, preferably 90 to 100 mol-% of the diol groups are ethylene glycol and/or butanediol-1,4 groups.

The preferred polyalkylene terephthalates E may contain, apart from the ethylene glycol or butanediol-1,4 groups, 0 to 20 mol-% of groups from other aliphatic diols with 3 to 12 carbon atoms or cycloaliphatic diols with 6 to 12 carbon atoms, e.g groups from propanediol-1,3, 2-ethylpropanediol-1,3, neopentyl glycol, pentanediol-1,5, hexanediol-1,6, cyclohexanedi-methanol-1,4, 3-methylpentanediol-1,3, and -1,6, 2-ethylhexanediol-1,3, 2,2-diethylpropanediol-1,3, hexanediol-2,5, 1,4-di-(β-hydroxyethoxy)-benzene, 2,2-bis-(4-hydroxycyclohexyl)-propane, 2,4-dihydroxy-1,1,3,3-tetramethylcyclobutane, 2,2-bis-(3-β-hydroxyethoxyphenyl)-propane and 2,2-bis-(4-hydroxypropoxyphenyl)-propane (DE-OS 2 407 647, 2 407 776, 2 715 932).

The polyalkylene terephthalates E may be branched by the incorporation of relatively small amounts of 3- or 4-valent alcohols or tri- or tetracarboxylic acids, as are described in DE-OS 1 900 270 and U.S. Pat. No. 3,692,744. Examples of preferred branching agents are trimesic acid, trimellitic acid, trimethylolethane, trimethylolpropane and pentaerythritol. It is advisable to use not more than 1 mol-% of branching agent, relative to the acid component.

Particularly preferred are polyalkylene terephthalates E which have been prepared only from terephthalic acid and its reactive derivatives (e.g. its dialkyl esters) and ethylene glycol and/or butanediol-1,4, and mixtures of these polyalkylene terephthalates.

Preferred polyalkylene terephthalates E are also copolyesters which are prepared from at least two of the above-mentioned alcohol components; particularly preferred copolyesters are poly-(ethylene glycol/butane-diol-1,4) terephthalates.

The polyalkylene terephathalates preferably used as component E possess in general an intrinsic viscosity of 0.4 to 1.5 dl/g, preferably 0.5 to 1.3 dl/g, in particular 0.6 to 1.2 dl/g, measured in phenol/o-dichlorobenzene (1:1 parts by weight) at 25° C.

The mixtures according to the invention containing A, B, C, D, E and optionally the usual additives such as lubricants, stabilisers, pigments, mould release agents, antistatic agents, fillers (e.g. glass fibres, glass beads, silica gel) are prepared by blending the particular components in known ways simultaneously or successively and then melt-compounding or melt-extruding at temperatures of 150° C. to 300° C. in conventional units such as internal mixers, extruders or twin shaft screws.

Suitable thermoplastic polyurethanes F are products which are obtained by reaction of at least one duisocyanate, at least one preferably short-chain chain-extender (particularly diols) and at least one higher compound containing hydroxyl groups or amino groups. These types of product are known.

Diisocyanates to be used according to the invention are per se known aliphatic, cycloaliphatic, araliphatic, aromatic and heterocyclic diisocyanates. Preferred diisocyanates according to the invention are aromatic diisocyanates, naphthylene-1,5-diisocyanate, 3,3'-dimethyl-4,4'-diisocyanatodiphenyl (TODI), 1,4-diisocyanatobenzene and the corresponding hydrogenated product, toluylene diisocyanates and in particular the isomers of diphenylmethane diisocyanate. Particularly preferred is 4,4'-diisocyanatodiphenylmethane or its isomeric mixture with up to 5 mol-%, preferably 1 to 4 mol-%, of 2,4'-diisocyanato-diphenylmethane, generally accompanied by very small amounts of the 2,2'-diisocyanatodiphenylmethane isomer.

The diisocyanates mentioned may optionally be used together with up to about 15 mol-% (relative to the diisocyanate) of a higher-functional polyisocyanate; the amount of the higher functional polyisocyanate must, however, be restricted so that a polyurethane elastomer which is still fusible or thermoplastic is obtained. A larger amount of higher-functional isocyanates must in general be compensated for by the joint use of on average less than di-functional hydroxyl or amino compounds or even of monoisocyanates, so that too extensive chemical cross-linking of the product is avoided. Examples of higher functional isocyanates and mono-functional compounds may be found in the prior art. Monoamines such as butyl- or dibutylamine, hydroxylamine, stearylamine, N-methylstearylamine, and monoalcohols such as butanol-1, 2-ethylhexanol-1, dodecanol-1, isobutanol or tert.butanol, cyclohexanol or ethylene glycol monomethyl ether and stearyl alcohol may be mentioned, for example.

Preferred chain-lengthening agents are e.g. the compounds described in DE-A 2 302 564, 2 423 764, 2 549 372, 2 402 840, 2 457 387 and 2 854 384. These are in particular lower polyalcohols, preferably diols, diamines, in particular aliphatic diamines, hydrazines and hydrazide derivatives. Diethyl-toluylenediamine or isophoronediamine may be mentioned as diamines. Aminoalcohols such as ethanolamine, diethanolamine, N-methyldiethanolamine, 3-aminopropanol or compounds such as hydrazine (hydrate) or carbodihydrazide may also be considered according to the invention. Preferred chain-lengthening agents are diols such as ethylene glycol, di- and triethylene glycol, hexanediol-1,6 and hydroquinone-di-β-hydroxyethylether, and butanediol-1,4 is particularly preferred, optionally mixed with other diols, especially hexanediol-1,6. Mixtures of 96 to 80 mol-% of butanediol-1,4 and 4 to 20 mol-%. of hexanediol-1,6 are preferred. The molecular weight of the chain-lengthener is 32 to 399, preferably 62 to 220.

Furthermore, monofunctional compounds in very small amounts, e.g. 0.01 to 4% by weight, relative to the polyurethane solid, may also be used in known ways as so-called chain terminators. Examples are monoalcohols such as butanol, 2-ethylhexanol, isobutyl alcohol, octanol-1, stearyl alcohol or monoamines such as aniline, dibutylamine, N-methyl-stearylamine, or piperidine.

Preferred higher compounds which contain hydroxyl groups are polyester-, polyestercarbonate- and polyetherdiols, e.g. polyesterdiols made from straight-chain or branched aliphatic and/or cycloaliphatic diols and aliphatic dicarboxylic acids, especially adipic acid. They may also, however, contain very small amounts of aromatic dicarboxylic acids, especially phthalic acid and optionally also terepthalic acid or their hydrogenated products.

Furthermore, hydroxypolycarbonates and hydroxypolycaprolactones are suitable. In a particularly preferred embodiment, butanediol-1,4 adipate with a molecular weight of 1,500 to 3,000 is used.

Also preferred are hydroxyetherdiols based on ethylene oxide, propylene oxide or mixed polyethers from propylene oxide and/or ethylene oxide and/or tetrahydrofuran, thus e.g. hydroxyetherdiols based on tetrahydrofuran with a molecular weight of 1,000 to 3,000. Suitable polyols are described in detail e.g. in DE-OS 2 302 564, 2 423 764, 2 549 372 (U.S. Pat. No. 3,963,679), DE-OS 2 402 840 (U.S. Pat. No. 3,984,607), DE-AS 2 457 387 (U.S. Pat. No. 4,035,213) and in-DE-OS 2 854 384, 2 920 501 and 3 405 531.

Optionally, higher polyamino compounds may also be used, preferably with primary aromatic amino groups. Preferred representatives are for example prepared by the hydrolysis of the corresponding NCO prepolymers based on higher polyhydroxy compounds and excess aromatic diisocyanates by (preferably basic) hydrolysis. Examples of this process are given in DE-OS 2 948 419, DE-OS 3 039 600, DE-OS 3 112 118, EP-A 61 627, EP-A 71 132 and EP-A 97 869. In the first-mentioned document, further processes for preparing aromatic amino compounds with a higher molecular structure, so-called aminopolyethers, are mentioned, as they are suitable for the process according to the invention. Further methods of preparation are described in DE-AS 1 694 152, FR-PS 1 415 317 and DE-AS 1 155 907.

The mixtures according to the invention, containing A, B, C, D and E or F as well as optionally the usual additives such as lubricants, stabilisers, pigments, mould releasing agents, antistatic agents, fillers (e.g. class fibres, glass beads, silica gel), are prepared by blending the particular components in known ways simultaneously or successively at room temperature or at elevated temperature and the melt-compounding or melt-extruding at temperatures of 150° C. to 300° C. in conventional units such as internal mixers, extruders or twin shaft screws.

A preferred process for preparing the moulding compounds by blending particular combinations of the individual components is described above; using this process, moulding compounds are produced which lead to moulded items with particularly good surface finishes.

The moulding compounds in the present invention may be used to produce mouldings of any type, wherein normal methods of preparation may be used; they are particularly suitable for preparing those parts in which a combination of high strength, extreme hardness, good surface gloss, good heat-resistance and very good processability is required, such as e.g. large-area cladding for the interiors of motor vehicles with long flow-paths or housings for radio and television sets or computers, which have e.g. many ribs.

Processing the moulding compounds to give moulded parts takes place preferably by injection moulding, but may also be performed e.g. by thermoforming from sheets or films prepared beforehand by known methods.

The particle sizes cited above always denote average particle diameters $d_{50}$, determined by ultra-centrifuge measurements as in W. Scholtan et al., Kolloid-Z. u.Z. Polymere 250 (1972), 782 to 796.

EXAMPLES

I. Mixtures of A, B, C and D

Thermoplastic resin A

A statistical styrene/acrylonitrile=72:28 copolymer with a $\overline{M}_w$ of ca. 105,000 and a $\overline{M}_w/\overline{M}_n-1$ value $\leq 2$, obtained by radical solution polymerisation.

Thermoplastic resin B.1

A statistical styrene/acrylonitrile=72:28 copolymer with a $\overline{M}_w$ of ca. 51,000 and a $\overline{M}_w/\overline{M}_n-1$ value $\leq 2$, obtained by radical emulsion polymerisation.

Thermoplastic resin B.2

A statistical styrene/acrylonitrile=72:28 copolymer with a $\overline{M}_w$ of ca. 41,000, obtained by "incidental polymerisation" of styrene and acrylonitrile (non-grafted styrene/acrylonitrile copolymer) during the preparation of a graft rubber by radical emulsion polymerisation.

Thermoplastic resin B.3

A statistical styrene/acrylonitrile=72:28 copolymer with a $\overline{M}_w$ of ca. 31,000, obtained by "incidental polymerisation" of styrene and acrylonitrile (non-grafted styrene/acrylonitrile copolymer) during the preparation of a graft rubber by radical emulsion polymerisation.

Thermoplastic resin C

A statistical styrene/acrylonitrile=72:28 copolymer with a $\overline{M}_w$ of ca. 4,500, obtained by radical emulsion polymerisation.

Graft rubber D.1

Graft rubber obtained by radical emulsion polymerisation of a styrene/acrylonitrile =72:28 mixture using a particulate polybutadiene, wherein an average particle diameter ($d_{50}$) of ca. 0.38 μm results and 62 parts by weight per 100 parts by weight of polybutadiene of the styrene/acrylonitrile copolymer are chemically bonded to the polybutadiene.

Graft rubber D.2

Graft rubber obtained by radical emulsion polymerisation of a styrene/acrylonitrile=72:28 mixture using a particulate polybutadiene, wherein an average particle diameter ($d_{50}$) of ca. 0.38 μm results and 21 parts by weight per 100 parts by weight of polybutadiene of the styrene/acrylonitrile copolymer are chemically bonded to the polybutadiene.

The products A–D are blended in a 1.3 l internal mixer at temperatures of 160° C. to 220° C. by fusing them together. Test pieces are obtained by injection moulding at 240° C.

The notched impact strength was determined at room temperature ($a_n^{RT}$) and at −40° C. ($a_n^{-40°\ C.}$) as in ISO 180/1A (unit: $kJ/m^2$), the hardness was measured as in DIN 53 456 (unit: $N/mm^2$) and the Vicat softening point (method B) according to DIN 53 460 (unit: ° C). Processability was characterised by measuring the volume flow index MVI as in DIN 53 735 U (unit: $cm^3/10$ min) and the injection pressure required (see F. Johannaber, Kunststoffe 74 (1984), 1, pages 2 to 5); the gloss measurement was performed according to DIN 67 530 on a flat sheet with a 60° angle of reflection (reflectometer value) using the "Multi-Gloss" multi-angle reflectometer from Byk-Mallinckrodt. Table 1 summarises the compositions of the materials tested and Table 2 summarises the test data. The mixtures according to the invention simultaneously possess high strength, high hardness, good heat resistance, high gloss and good processability, while the comparison mixtures have at least one property which is much poorer.

TABLE 1

Compositions of the materials

| Example | A pts. wt. | B.1 pts. wt. | B.2 pts. wt. | B.3 pts. wt. | C. pts. wt. | D.1 pts. wt. | D.2 pts. wt. |
|---|---|---|---|---|---|---|---|
| 1 | 48.5 | 10 | 7.6 | — | 1.5 | 32.4 | — |
| 2 | 58.5 | — | 7.6 | — | 1.5 | 32.4 | — |
| 3 (comp.) | 10 | 48.5 | 7.6 | — | 1.5 | 32.4 | — |
| 4 (comp.) | 1.5 | 48.5 | 7.6 | — | 10 | 32.4 | — |
| 5 (comp.) | — | 58.5 | 7.6 | — | 15 | 32.4 | — |
| 6 | 56 | 12.5 | — | 4 | 1.5 | — | 26 |
| 7 | 68.5 | — | — | 4 | 1.5 | — | 26 |
| 8 (comp.) | 12.5 | 56 | — | 4 | 1.5 | — | 26 |
| 9 (comp.) | 1.5 | 56 | — | 4 | 12.5 | — | 26 |
| 10 (comp.) | — | 68.5 | — | 4 | 1.5 | — | 26 | pts. wt. = parts by weight

TABLE 2

Test data for the materials

| Example | RT $a_n$ ($kJ/m^2$) | −40° C. $a_n$ ($kJ/m^2$) | Hc ($N/mm^2$) | Vicat B (° C.) | MVI ($cm^3/$ 10 min) | inj. press. (bar) | deg. of gloss |
|---|---|---|---|---|---|---|---|
| 1 | 32 | 16 | 86 | 101 | 10.3 | 172 | 81 |
| 2 | 33 | 20 | 87 | 102 | 8.4 | 154 | 82 |
| 3 (comp.) | 20 | 10 | 85 | 99 | 40 | 105 | 73 |
| 4 (comp.) | 4 | 3 | 83 | 95 | 99 | 70 | 73 |
| 5 (comp.) | 12 | 8 | 85 | 98 | 54 | 91 | 73 |
| 6 | 36 | 11 | 86 | 99 | 12.3 | 133 | 79 |
| 7 | 39 | 12 | 85 | 100 | 9.4 | 139 | 76 |

TABLE 2-continued

Test data for the materials

| Example | RT $a_n$ (kJ/m²) | −40° C. $a_n$ kJ/m²) | Hc (N/mm²) | Vicat B (° C.) | MVI (cm³/ 10 min) | inj. press. (bar) | deg. of gloss |
|---|---|---|---|---|---|---|---|
| 8 (comp.) | 13 | 7 | 84 | 97 | 46 | 91 | 73 |
| 9 (comp.) | 2 | 3 | 82 | 92 | 153 | 57 | 75 |
| 10 (comp.) | 6 | 4 | 83 | 100 | 78 | 78 | 68 |

II. Mixtures of A, B, C, D and E

Thermoplastic resin A

A statistical styrene/acrylonitrile =72:28 copolymer with a $\overline{M}_w$ of ca. 105,000 and a $\overline{M}_w/\overline{M}_n$−1 value $\leq 2$, obtained by radical solution polymerisation.

Thermoplastic resin B.1

A statistical styrene/acrylonitrile =72:28 copolymer with a $\overline{M}_w$ of ca. 51,000 and a $\overline{M}_w/\overline{M}_n$−1 value $\leq 2$, obtained by radical emulsion polymerisation.

Thermoplastic resin B.2

A statistical styrene/acrylonitrile =72:28 copolymer with a $\overline{M}_w$ of ca. 41,000, obtained by "incidental polymerisation" of styrene and acrylonitrile (non-grafted styrene/acrylonitrile copolymer) during the preparation of a graft rubber by radical emulsion polymerisation.

Thermoplastic resin B.3

A statistical styrene/acrylonitrile =72:28 copolymer with a $\overline{M}_w$ of ca. 31,000, obtained by "incidental polymerisation" of styrene and acrylonitrile (non-grafted styrene/acrylonitrile copolymer) during the preparation of a graft rubber by radical emulsion polymerisation Thermoplastic resin C A statistical styrene/acrylonitrile =72:28 copolymer with a $\overline{M}_w$ of ca. 4,500, obtained by radical emulsion polymerisation.

Graft rubber D.1

Graft rubber obtained by radical emulsion polymerisation of a styrene/acrylonitrile =72:28 mixture using a particulate polybutadiene, wherein an average particle diameter ($d_{50}$) of ca. 0.38 μm results and 62 parts by weight per 100 parts by weight of polybutadiene of the styrene/acrylonitrile copolymer are chemically bonded to the polybutadiene.

Graft rubber D.2

Graft rubber obtained by radical emulsion polymerisation of a styrene/acrylonitrile =72:28 mixture using a particulate polybutadiene, wherein an average particle diameter ($d_{50}$) of ca. 0.38 μm results and 21 parts by weight per 100 parts by weight of polybutadiene of the styrene/acrylonitrile copolymer are chemically bonded to the polybutadiene.

Aromatic polycarbonate resin E.1

An aromatic polycarbonate from 2,2-bis-(4-hydroxyphenyl)-propane (bisphenol A) with a relative viscosity of 1.26 (measured in $CH_2Cl_2$ at 25° C. in the form of a 0.5% by weight strength solution).

Polybutylene terephthalate resin E.2

®Pocan 1500 from Bayer AG

The products A–E are mixed in a 1.3 l internal mixer at temperatures of 180° C. to 240° C. by fusing them together. Test pieces are obtained by injection moulding at 260° C.

The notched impact strength was determined at room temperature ($a_n^{RT}$) and at −40° C. ($a_n^{-40°\ C.}$) as in ISO 180/1A (unit: kJ/m²), and the Vicat softening point (method B) according to DIN 53 460 (unit: ° C). The processability was characterised by measuring the volume flow index MVI as in DIN 53 735 U (unit: cm³/10 min); the gloss measurement was performed according to DIN 67 530 on a flat sheet with a 60° angle of reflection (reflectometer value) using the "Multi-Gloss" multi-angle reflectometer from Byk-Mallinckrodt.

Table 3 summarises the compositions of the materials tested and Table 4 summarises the test data. The mixtures according to the invention simultaneously possess which values for strength, heat resistance and gloss and very good processability while the comparison mixtures have at least one property which is much poorer.

TABLE 3

Compositions of the materials

| Example | A pts. wt. | B.1 pts. wt. | B.2 pts. wt. | B.3 pts. wt. | C pts. wt. | D.1 pts. wt. | D.2 pts. wt. | E.1 pts. wt. | E.2 pts. wt. |
|---|---|---|---|---|---|---|---|---|---|
| 1 | 16 | 7.5 | 4.75 | — | 1.5 | 20.25 | — | 50 | — |
| 2 (comp.) | 1.5 | 16 | 4.75 | — | 7.5 | 20.25 | — | 50 | — |
| 3 (comp.) | — | 23.5 | 4.75 | — | 1.5 | 20.25 | — | 50 | — |
| 4 | 38 | 5 | — | 0.6 | 2 | — | 14.4 | 40 | — |
| 5 (comp.) | 15 | 15 | — | 0.6 | 15 | — | 14.4 | 40 | — |
| 6 | 44 | 5 | 5.7 | — | 1 | 24.3 | — | 20 | — |
| 7 (comp.) | 20 | 15 | 5.7 | — | 15 | 24.3 | — | 20 | — |
| 8 | 6.5 | 2 | 7.6 | — | 1.5 | 32.4 | — | — | 50 |
| 9 (comp.) | 1.5 | 2 | 7.6 | — | 6.5 | 32.4 | — | — | 50 |
| 10 | 30 | 8 | 7.6 | — | 2 | 32.4 | — | — | 20 |
| 11 (comp.) | 12.5 | 12.5 | 7.6 | — | 15 | 32.4 | — | — | 20 | pts. wt. = parts by weight

TABLE 4

Test data for the materials

| Example | $a_n^{RT}$ (kJ/m²) | $a_n^{-40° C.}$ (kJ/m²) | Vicat B (° C.) | MVI (cm³/10 min) | deg. of gloss |
|---|---|---|---|---|---|
| 1 | 76 | 22 | 114 | 10.1 | 77 |
| 2 (comp.) | 55 | 9 | 109 | 5.7 | 73 |
| 3 (comp.) | 63 | 18 | 117 | 6.3 | 80 |
| 4 | 73 | 32 | 116 | 8.8 | 77 |
| 5 (comp.) | 14 | 3 | 113 | 16.1 | 74 |
| 6 | 34 | 19 | 106 | 4.4 | 79 |
| 7 (comp.) | 8 | 2 | 104 | 18.5 | 75 |
| 8 | 29 | 6 | 100 | 2.4 | 80 |
| 9 (comp.) | 12 | 6 | 98 | 3.5 | 75 |
| 10 | 23 | 9 | 99 | 4.0 | 78 |
| 11 (comp.) | 10 | 6 | 96 | 5.1 | 77 |

III. Mixture of A, B, C, D and F

Thermoplastic resin A

A statistical styrene/acrylonitrile =72:28 copolymer with a $\overline{M}_W$ of ca. 105,000 and a $\overline{M}_w/\overline{M}_n-1$ value $\leq 2$, obtained by radical solution polymerisation.

Thermoplastic resin B.1

A statistical styrene/acrylonitrile =72:28 copolymer with a $\overline{M}_w$ of ca. 51,000 and a $\overline{M}_w/\overline{M}_n-1$ value $\leq 2$, obtained by radical emulsion polymerisation.

Thermoplastic resin B.2

A statistical styrene/acrylonitrile =72:28 copolymer with a $\overline{M}_w$ of ca. 41,000, obtained by "incidental polymerisation" of styrene and acrylonitrile (non grafted styrene/acrylonitrile copolymer) during the preparation of a graft rubber by radical emulsion polymerisation.

Thermoplastic resin C

A statistical styrene/acrylonitrile =72:28 copolymer with a $\overline{M}_w$ of ca. 4,500, obtained by radical emulsion polymerisation.

Graft rubber D

Graft rubber obtained by radical emulsion polymerisation of a styrene/acrylonitrile =72:28 mixture using a particulate polybutadiene, wherein an average particle diameter ($d_{50}$) of ca. 0.38 μm results and 62 parts by weight of styrene/acrylonitrile copolymer per 100 parts by weight of polybutadiene are chemically bonded to the polybutadiene.

Thermoplastic polyurethane F

®Desmopan 385 from Bayer AG.

The products A–E are blended in a 1.3 l internal mixer at temperatures between 160° C. and 200° C. by fusing them together. Test pieces are obtained by injection moulding at 220° C.

The notched impact strength was determined at room temperature ($a_n^{RT}$) and at −40° C. ($a_n^{-40° C.}$) according to ISO 180/1A (unit: kJ/m²). The hardness was measured according to DIN 53 456 (unit: N/mm²) and the Vicat softening point (method B) according to DIN 53 460 (unit: ° C.). The processability was characterised by measuring the volume flow index MVI according to DIN 53 735 U (unit: cm³/10 min); the gloss measurement was performed according to DIN 67 530 on a flat sheet with a 60° angle of reflection (reflectometer value) using the "Multi-Gloss" multi-angle reflectometer from Byk-Mallinckrodt.

Table 5 summarises the compositions of the materials tested and Table 6 summarises the test data obtained. The mixtures according to the invention simultaneously possess good values for strength, hardness and heat resistance, high gloss and very good processability, while the comparison mixtures have at least one property which is much poorer.

TABLE 5

Compositions of the materials

| Example | A pts. wt. | B.1 pts. wt. | B.2 pts. wt. | C pts. wt. | D pts. wt. | F pts. wt. |
|---|---|---|---|---|---|---|
| 1 | 53.5 | 10 | 5.7 | 1.5 | 24.3 | 5 |
| 2 (comp.) | 10 | 53.5 | 5.7 | 1.5 | 24.3 | 5 |
| 3 (comp.) | 1.5 | 53.5 | 5.7 | 10 | 24.3 | 5 |
| 4 (comp.) | — | 63.5 | 5.7 | 1.5 | 24.3 | 5 |
| 5 | 55 | 9 | 4.75 | 1 | 20.25 | 10 |
| 6 (comp.) | 9 | 55 | 4.75 | 1 | 20.25 | 10 |
| 7 (comp.) | 1 | 55 | 4.75 | 9 | 20.25 | 10 |

TABLE 6

Test data for the materials

| Example | $a_n^{RT}$ (kJ/m²) | $a_n^{-40° C.}$ (kJ/m²) | Hc (N/mm²) | Vicat B (° C.) | MVI (cm³/10 min) | deg. of gloss |
|---|---|---|---|---|---|---|
| 1 | 25 | 10 | 101 | 96 | 20 | 87 |
| 2 (comp.) | 11 | 6 | 99 | 95 | 81 | 83 |
| 3 (comp.) | 3 | 3 | 101 | 91 | 214 | 86 |
| 4 (comp.) | 6 | 5 | 105 | 95 | 127 | 84 |
| 5 | 28 | 11 | 87 | 91 | 28 | 86 |
| 6 (comp,) | 9 | 6 | 87 | 90 | 94 | 83 |
| 7 (comp.) | 4 | 3 | 86 | 89 | 206 | 83 |

What is claimed is:

1. Thermoplastic materials comprising

A) 5 to 80 parts by weight of a thermoplastic co- or terpolymer made from monomers selected from the group consisting of styrene, α-methylstyrene, methyl methacrylate and acrylonitrile with an average molecular weight ($M_w$) of 70,000 to 150,000, B) 1 to 30 parts by weight of a thermoplastic copolymer made from 60 to 95% by weight of styrene and/or α-methylstyrene and 40 to 5% by weight of acrylonitrile with an average molecular weight ($M_w$) of 25,000 to 49,500, C) 0.1 to 10 parts by weight of a thermoplastic co- or terpolymer made from monomers selected from the group consisting of styrene, α-methylstyrene, methyl methacrylate and acrylonitrile, with an average molecular weight ($M_w$) of 1,500 to 6,000 and D) 0.5 to 50 parts by weight of a particulate graft rubber with a glass transition temperature of $\leq 10°$ C. and an average particle diameter ($d_{50}$) of 0.05 to 0.50 μm, which contains 15 to 80 parts by weight of a chemically bonded polymer made from styrene, methyl methacrylate, acrylonitrile or mixtures thereof per 100 parts by weight of rubber, wherein the 0.1 to 10 parts by weight of component C) is in addition to any thermoplastic copolymers or terpolymers having an average molecular weight ($M_w$) in the range from 1,500 to 6,000 that may be present in components A) and B).

2. A process for the preparation of thermoplastic materials according to claim 1, in which the components B, C and D are mixed first and the resulting mixture is then blended with component A.

3. A method of using the materials according to claim 1, wherein said materials are moulded into moulded parts.

4. Thermoplastic materials according to claim 1 comprising
   20 to 70 parts by weight of A) with an average molecular weight ($M_w$) of 70,000 to 150,000,
   4 to 20 parts by weight of B), made from 65 to 85% by weight of styrene and/or α-methylstyrene and 35 to 15% by weight of acrylonitrile, with an average molecular weight ($M_w$) of 25,000 to 49,500,
   0.5 to 5 parts by weight of C) with an average molecular weight ($M_w$) of 1,500 to 6,000 and
   1 to 40 parts by weight of D) with an average particle diameter ($d_{50}$) of 0.10 to 0.45 μm and 20 to 75 parts by weight of the polymer per 100 parts by weight of rubber, wherein the 0.5 to 5 parts by weight of component C) is in addition to any thermoplastic copolymers or terpolymers having an average molecular weight ($M_w$) in the range from 1,500 to 6,000 that may be present in components A) and B).

5. Thermoplastic materials according to claim 1, wherein the average molecular weight ($M_w$) of the thermoplastic co- or terpolymer in A) is 70,000 to 105,000.

6. Thermoplastic materials according to claim 5, wherein the average molecular weight ($M_w$) of the thermoplastic copolymer in B) is 25,000 to 41,000.

7. Thermoplastic materials comprising
   A) 5 to 80 parts by weight of a thermoplastic co- or terpolymer made from monomers selected from the group consisting of styrene, α-methylstyrene, methyl methacrylate and acrylonitrile with an average molecular weight ($M_w$) of 70,000 to 150,000,
   B) 1 to 30 parts by weight of a thermoplastic copolymer made from 60 to 95% by weight of styrene and/or α-methylstyrene and 40 to 5% by weight of acrylonitrile with an average molecular weight ($M_w$) of 25,000 to 49,500,
   C) 0.1 to 10 parts by weight of a thermoplastic co- or terpolymer made from monomers selected from the group consisting of styrene, α-methylstyrene, methyl methacrylate and acrylonitrile, with an average molecular weight ($M_w$) of 1,500 to 6,000,
   D) 0.5 to 50 parts by weight of a particulate graft rubber with a glass transition temperature of ≦10° C. and an average particle diameter ($d_{50}$) of 0.05 to 0.50 μm, which contains 15 to 80 parts by weight of a chemically bonded polymer made from styrene, methyl methacrylate, acrylonitrile or mixtures thereof per 100 parts by weight of rubber, wherein the 0.1 to 10 parts by weight of component C) is in addition to any thermoplastic copolymers or terpolymers having an average molecular weight ($M_w$) in the range from 1,500 to 6,000 that may be present in components A) and B), and
   E) 10 to 300 parts by weight of an aromatic polycarbonate and/or polyalkylene terephthalate per 100 parts by weight of A+B+C+D.

8. Thermoplastic materials according to claim 7, wherein the average molecular weight ($M_w$) of the thermoplastic co- or terpolymer in A) is 70,000 to 105,000 and the average molecular weight ($M_w$) of the thermoplastic copolymer in B) is 25,000 to 41,000.

9. Thermoplastic materials comprising
   A) 5 to 80 parts by weight of a thermoplastic co- or terpolymer made from monomers selected from the group consisting of styrene, α-methylstyrene, methyl methacrylate and acrylonitrile with an average molecular weight ($M_w$) of 70,000 to 150,000,
   B) 1 to 30 parts by weight of a thermoplastic copolymer made from 60 to 95% by weight of styrene and/or α-methylstyrene and 40 to 5% by weight of acrylonitrile with an average molecular weight ($M_w$) of 25,000 to 60.000,
   C) 0.1 to 10 parts by weight of a thermoplastic co- or terpolymer made from monomers selected from the group consisting of styrene, α-methylstyrene, methyl methacrylate and acrylonitrile, with an average molecular weight ($M_w$) of 1,500 to 6,000,
   D) 0.5 to 50 parts by weight of a particulate graft rubber with a glass transition temperature of ≦10° C. and an average particle diameter ($d_{50}$) of 0.05 to 0.50 μm, which contains 15 to 80 parts by weight of a chemically bonded polymer made from styrene, methyl methacrylate, acrylonitrile or mixtures thereof per 100 parts by weight of rubber, wherein the 0.1 to 10 parts by weight of component C) is in addition to any thermoplastic copolymers or terpolymers having an average molecular weight ($M_w$) in the range from 1,500 to 6,000 that may be present in components A) and B),
   E) 10 to 300 parts by weight of an aromatic polycarbonate and/or polyalkylene terephthalate per 100 parts by weight of A+B+C+D, and F) 1 to 40 parts by weight of a thermoplastic polyurethane.

10. Thermoplastic materials comprising
    A) 5 to 60 parts by weight of a thermoplastic co- or terpolymer made from monomers selected from the group consisting of styrene, α-methyl-styrene, methyl methacrylate and acrylonitrile, with an average molecular weight ($M_w$) of 70,000 to 150,000,
    B) 1 to 15 parts by weight of a thermoplastic copolymer made from 60 to 95% by weight of styrene and/or α-methylstyrene and 40 to 5% by weight of acrylonitrile with an average molecular weight ($M_w$) of 25,000 to 49,500,
    C) 0.1 to 5 parts by weight of a thermoplastic co- or terpolymer made from monomers selected from the group consisting of styrene, α-methylstyrene, methyl methacrylate and acrylonitrile with an average molecular weight ($M_w$) of 1,500 to 6,000,
    D) 0.5 to 40 parts by weight of a particulate graft rubber with a glass transition temperature of ≦10° C. and an average particle diameter ($d_{50}$) of 0.05 to 0.50 μm, which contains 15 to 80 parts by weight of a chemically bonded polymer made from styrene, methyl methacrylate, acrylonitrile or mixtures thereof per 100 parts by weight of rubber and
    E) 10 to 300 parts by weight of an aromatic polycarbonate and/or polyalkylene terephthalate per 100 parts by weight of A+B+C+D.

11. The thermoplastic materials of claim 10, wherein component E) is 10 to 300 parts by weight of a polyalkylene terephthalate per 100 parts by weight of A+B+C+D.

12. Thermoplastic materials according to claim 10, wherein the average molecular weight ($M_w$) of the thermoplastic co- or terpolymer in A) is 70,000 to 105,000.

13. Thermoplastic materials according to claim 12, wherein the average molecular weight ($M_w$) of the thermoplastic copolymer in B) is 25,000 to 41,000.

14. Thermoplastic materials comprising
   A) 10 to 80 parts by weight of a thermoplastic co- or terpolymer made from monomers selected from the group consisting of styrene, α-methylstyrene, methyl methacrylate and acrylonitrile, with an average molecular weight ($M_w$) of 70,000 to 150,000,
   B) 1 to 30 parts by weight of a thermoplastic copolymer made from 60 to 95% by weight of styrene and/or α-methylstyrene and 40 to 5% by weight of acrylonitrile with an average molecular weight ($M_w$) of 25,000 to 49,500,
   C) 0.1 to 5 parts by weight of a thermoplastic co- or terpolymer made from monomers selected from the group consisting of styrene, α-methylstyrene, methyl methacrylate and acrylonitrile, with an average molecular weight ($M_w$) of 1,500 to 6,000,
   D) 0.5 to 50 parts by weight of a particulate grafted rubber with a glass transition temperature of $\leq 10°$ C. and an average particle diameter ($d_{50}$) of 0.05 to 0.50 µm, which contains 15 to 80 parts by weight of a chemically bonded polymer made from styrene, methyl methacrylate, acrylonitrile or mixtures thereof, per 100 parts by weight of rubber and
   F) 1 to 40 parts by weight of thermoplastic polyurethane.

15. Thermoplastic materials according to claim 14, wherein the average molecular weight ($M_w$) of the thermoplastic co- or terpolymer in A) is 70,000 to 105,000.

16. Thermoplastic materials according to claim 15, wherein the average molecular weight ($M_w$) of the thermoplastic copolymer in B) is 25,000 to 41,000.

17. Thermoplastic materials comprising
   A) 5 to 80 parts by weight of a thermoplastic co- or terpolymer made from monomers selected from the group consisting of styrene, α-methylstyrene, methyl methacrylate and acrylonitrile with an average molecular weight ($M_w$) of 70,000 to 119,000,
   B) 1 to 30 parts by weight of a thermoplastic copolymer made from 60 to 95% by weight of styrene and/or α-methylstyrene and 40 to 5% by weight of acrylonitrile with an average molecular weight ($M_w$) of 25,000 to 60,000,
   C) 0.1 to 10 parts by weight of a thermoplastic co- or terpolymer made from monomers selected from the group consisting of styrene, α-methylstyrene, methyl methacrylate and acrylonitrile, with an average molecular weight ($M_w$) of 1,500 to 6,000 and
   D) 0.5 to 50 parts by weight of a particulate grafted rubber with a glass transition temperature of $\leq 10°$ C. and an average particle diameter ($d_{50}$) of 0.05 to 0.50 µm, which contains 15 to 80 parts by weight of a chemically bonded polymer made from styrene, methyl methacrylate, acrylonitrile or mixtures thereof per 100 parts by weight of rubber, wherein the 0.1 to 10 parts by weight of component C) is in addition to any thermoplastic copolymers or terpolymers having an average molecular weight ($M_w$) in the range from 1,500 to 6,000 that may be present in components A) and B).

18. Thermoplastic materials comprising
   A) 5 to 60 parts by weight of a thermoplastic co- or terpolymer made from monomers selected from the group consisting of styrene, α-methyl-styrene, methyl methacrylate and acrylonitrile, with an average molecular weight ($M_w$) of 70,000 to 119.000,
   B) 1 to 15 parts by weight of a thermoplastic copolymer made from 60 to 95% by weight of styrene and/or α-methylstyrene and 40 to 5% by weight of acrylonitrile with an average molecular weight ($M_w$) of 25,000 to 60,000,
   C) 0.1 to 5 parts by weight of a thermoplastic co- or terpolymer made from monomers selected from the group consisting of styrene, α-methylstyrene, methyl methacrylate and acrylonitrile with an average molecular weight ($M_w$) of 1,500 to 6,000,
   D) 0.5 to 40 parts by weight of a particulate graft rubber with a glass transition temperature of $\leq 10°$ C. and an average particle diameter ($d_{50}$) of 0.05 to 0.50 µm, which contains 15 to 80 parts by weight of a chemically bonded polymer made from styrene, methyl methacrylate, acrylonitrile or mixtures thereof per 100 parts by weight of rubber and
   E) 10 to 300 parts by weight of an aromatic polycarbonate and/or polyalkylene terephthalate per 100 parts by weight of A+B+C+D.

19. The thermoplastic materials of claim 18, wherein component E) is 10 to 300 parts by weight of a polyalkylene terephthalate per 100 parts by weight of A+B+C+D.

20. Thermoplastic materials comprising
   A) 10 to 80 parts by weight of a thermoplastic co- or terpolymer made from monomers selected from the group consisting of styrene, α-methylstyrene, methyl methacrylate and acrylonitrile, with an average molecular weight ($M_w$) of 70,000 to 119,000,
   B) 2.5 to 30 parts by weight of a thermoplastic copolymer made from 60 to 95% by weight of styrene and/or α-methylstyrene and 40 to 5% by weight of acrylonitrile with an average molecular weight ($M_w$) of 25,000 to 60,000,
   C) 0.1 to 5 parts by weight of a thermoplastic co- or terpolymer made from monomers selected from the group consisting of styrene, α-methylstyrene, methyl methacrylate and acrylonitrile, with an average molecular weight ($M_w$) of 1,500 to 6,000,
   D) 0.5 to 50 parts by weight of a particulate grafted rubber with a glass transition temperature of $\leq 10°$ C. and an average particle diameter ($d_{50}$) of 0.05 to 0.50 µm, which contains 15 to 80 parts by weight of a chemically bonded polymer made from styrene, methyl methacrylate, acrylonitrile or mixtures thereof per 100 parts by weight of rubber and
   F) 1 to 40 parts by weight of thermoplastic polyurethane.

* * * * *